(No Model.)
J. F. BREUX.
BICYCLE.
No. 404,771. Patented June 4, 1889.
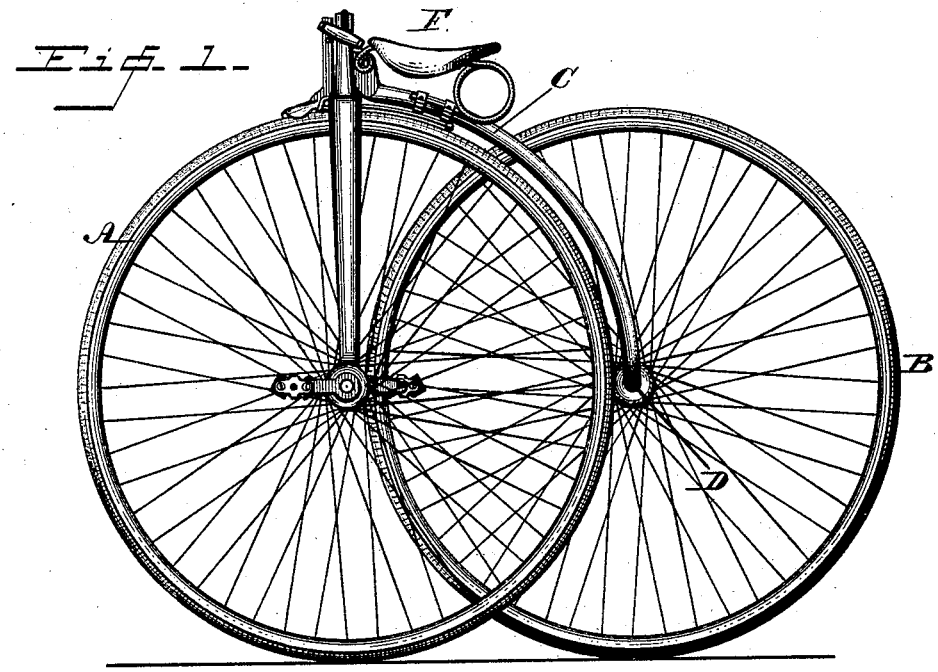
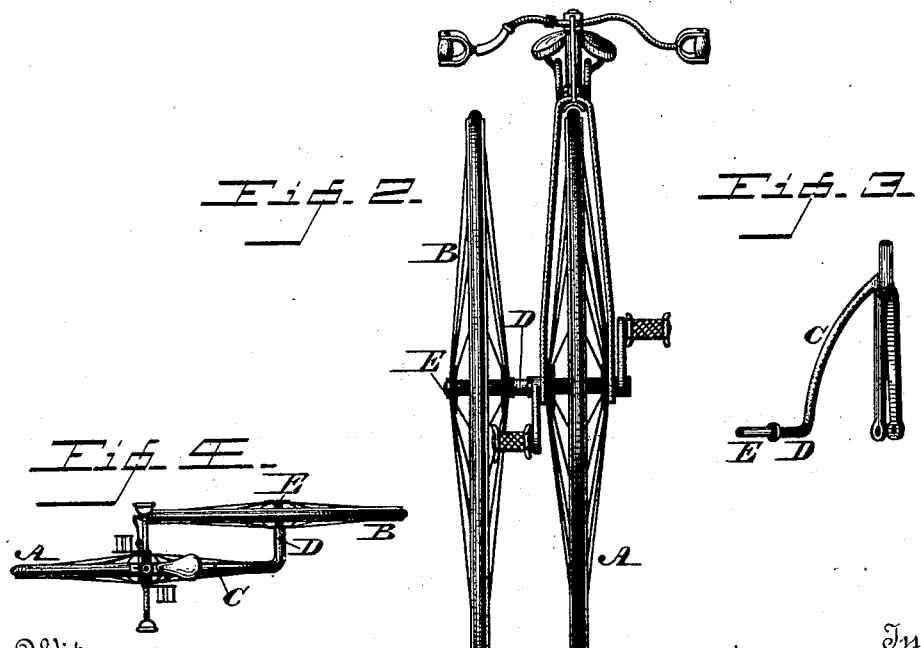
Witnesses
L. Douville,
A. P. Jennings.
Inventor
Joseph F. Breux
By his Attorneys
Biedersheim & Kintner

UNITED STATES PATENT OFFICE.

JOSEPH F. BREUX, OF VINELAND, ASSIGNOR OF ONE-HALF TO WILLIAM H. GROSSCUP, OF CAMDEN, NEW JERSEY.

BICYCLE.

SPECIFICATION forming part of Letters Patent No. 404,771, dated June 4, 1889.

Application filed February 18, 1889. Serial No. 300,334. (No model.)

*To all whom it may concern:*

Be it known that I, JOSEPH F. BREUX, a citizen of the United States, residing at Vineland, in the county of Cumberland and State of New Jersey, have invented a new and useful Improvement in Bicycles, which improvement is fully set forth in the following specification and accompanying drawings.

My invention consists of a bicycle constructed substantially as hereinafter described and claimed, whereby it may be run with great speed and with less liability to take headers.

Figure 1 represents a side elevation of a bicycle embodying my invention. Fig. 2 represents a front view thereof. Fig. 3 represents a perspective view, on a reduced scale, of the spine or backbone embodying my invention. Fig. 4 represents a top view of a portion thereof on a reduced scale.

Similar letters of reference indicate corresponding parts in the several figures.

Referring to the drawings, A designates the front wheel of a bicycle, B the rear wheel, and C the spine or backbone thereof.

The bicycle is provided with proper cranks, pedals, steering-head, saddle, &c., which in the present case are disposed in relation to the front wheel, the saddle being secured to the spine or backbone over the front wheel. The spine or backbone is bent laterally at its rear, forming the horizontal limb D, the end whereof constitutes or is provided with a journal E for the rear wheel B, it being seen that said rear wheel is at the side of the front wheel and diagonal thereto, it also being seen that two wheels of large diameter are employed, and said wheels may be said to be "spread." By this provision the bicycle may be run with great speed, its liability to overturn laterally is lessened, and headers are prevented, owing to the weight of the rear wheel counterbalancing that of the front wheel and the fact that the rear wheel runs as readily over obstructions and holes as the front one.

I am aware that it is not new to form a bicycle with a backbone having a bent lower end on which the rear wheel is mounted and to provide the same with a saddle over the front wheel; but I am not aware that the particular construction herein shown and claimed is old, wherein the backbone is curved over and in the plane with the rim of the wheel, its lower end being bent at substantially a right angle and having mounted thereon a wheel of substantially the same size as the front wheel, and having the saddle on the backbone directly over the rim of the front wheel.

Having thus described my invention, what I claim as new, and desire to secure by Letters Patent, is—

A bicycle having its backbone curved over and in the plane with the rim of the front wheel and having its lower end bent at substantially a right angle thereto, the rear wheel of substantially the same size as the front wheel and mounted on said bent end, and a saddle directly over the rim of the front wheel, said parts being combined substantially as and for the purpose set forth.

JOSEPH F. BREUX.

Witnesses:
C. H. BIRKINSHAW,
JOHN P. GAGE.